(12) United States Patent
Ehleiter et al.

(10) Patent No.: US 11,831,135 B2
(45) Date of Patent: Nov. 28, 2023

(54) GUIDE DEVICE FOR GUIDING AT LEAST ONE CONDUIT AND/OR AT LEAST ONE MEDIUM AND USE OF SUCH A GUIDE DEVICE

(71) Applicant: Daimler AG, Stuttgart (DE)

(72) Inventors: Juergen Ehleiter, Schorndorf (DE); Marc-Andre Graewer, Neuffen (DE)

(73) Assignee: Daimler AG, Stuttgart (DE)

( * ) Notice: Subject to any disclaimer, the term of this patent is extended or adjusted under 35 U.S.C. 154(b) by 256 days.

(21) Appl. No.: 17/427,377

(22) PCT Filed: Jan. 23, 2020

(86) PCT No.: PCT/EP2020/051552
§ 371 (c)(1),
(2) Date: Jul. 30, 2021

(87) PCT Pub. No.: WO2020/156910
PCT Pub. Date: Aug. 6, 2020

(65) Prior Publication Data
US 2022/0131353 A1 Apr. 28, 2022

(30) Foreign Application Priority Data
Jan. 31, 2019 (DE) ...................... 10 2019 000 691.7

(51) Int. Cl.
*H02G 3/04* (2006.01)
*B25J 19/00* (2006.01)

(52) U.S. Cl.
CPC ........ *H02G 3/0481* (2013.01); *B25J 19/0025* (2013.01); *H02G 3/0406* (2013.01)

(58) Field of Classification Search
CPC . H02G 3/0481; H02G 3/0406; B25J 19/0025; F16L 11/127; F16L 11/20;
(Continued)

(56) References Cited

U.S. PATENT DOCUMENTS 2,572,062 A * 10/1951 Sexton ................. B29D 23/001
138/148
7,735,265 B2 * 6/2010 Tinker .................. E04B 1/3211
52/2.21
(Continued)

FOREIGN PATENT DOCUMENTS

CN 104534195 A 4/2015
CN 105945930 A 9/2016
(Continued)

OTHER PUBLICATIONS

Chinese Office Action issued in Chinese application No. 202080011353.5 dated Sep. 27, 2022, with partial English translation (Twelve (12) pages).
(Continued)

*Primary Examiner* — Timothy J Thompson
*Assistant Examiner* — Michael F McAllister
(74) *Attorney, Agent, or Firm* — Crowell & Moring LLP

(57) ABSTRACT

A guide device for guiding a conduit or a medium includes a guide element which delimits a guide channel in which the conduit or the medium is accommodatable and guidable. The guide element has a first layer and a second layer which are disposed one inside the other, are pliable, and delimit a chamber system which is disposed between the first layer and the second layer. The chamber system has a plurality of chambers. The first layer and the second layer are impermeable to a fluid. By acting upon the chamber system with the fluid, the guide element, which is intrinsically pliable, is stiffenable and thereby converted into a rigid state.

12 Claims, 2 Drawing Sheets

(58) Field of Classification Search
CPC ... F16L 55/1652; F16L 55/1656; F16L 11/02; E21B 17/206; E21B 19/00; E21B 17/20; E21B 43/103
USPC ........................................................ 174/68.1
See application file for complete search history.

(56) References Cited

U.S. PATENT DOCUMENTS

| | | | | |
|---|---|---|---|---|
| 9,016,159 | B2* | 4/2015 | Kell | G02B 23/2476 |
| | | | | 74/490.04 |
| 10,184,266 | B1* | 1/2019 | Levine | B32B 25/08 |
| 2014/0246212 | A1* | 9/2014 | Pinarello | E21B 19/22 |
| | | | | 166/384 |
| 2014/0251638 | A1* | 9/2014 | Pinarello | F16L 11/127 |
| | | | | 166/381 |

FOREIGN PATENT DOCUMENTS

| | | |
|---|---|---|
| CN | 107073412 A | 8/2017 |
| DE | 44 35 644 A1 | 4/1995 |
| DE | 100 10 932 A1 | 9/2001 |
| DE | 203 01 947 U1 | 9/2003 |
| DE | 10 2008 009 919 A1 | 8/2009 |
| DE | 10 2012 000 798 A1 | 7/2013 |
| EP | 2 431 140 A1 | 3/2012 |
| GB | 2 421 786 A | 7/2006 |
| JP | 7-27260 A | 1/1995 |
| KR | 101743881 B1 | 6/2017 |

OTHER PUBLICATIONS

Chinese Office Action issued in Chinese application No. 202080011353.5 dated Mar. 4, 2022, with partial English translation (Eleven (11) pages).
German-language German Office Action issued in German application No. 10 2019 000 691.7 dated May 5, 2022 (Four (4) pages).
PCT/EP2020/051552, International Search Report dated Mar. 12, 2020 (Two (2) pages).
German-language German Office Action issued in German application No. 10 2019 000 691.7 dated Oct. 11, 2019 (Five (5) pages).

* cited by examiner

GUIDE DEVICE FOR GUIDING AT LEAST ONE CONDUIT AND/OR AT LEAST ONE MEDIUM AND USE OF SUCH A GUIDE DEVICE

BACKGROUND AND SUMMARY OF THE INVENTION

The invention relates to a guide device for guiding at least one conduit and/or at least one medium. Furthermore, the invention relates to a use of such a guide device.

Such guide devices for respectively guiding at least one conduit and/or at least one medium are already sufficiently known from the general prior art. The respective guide device has at least one guide element which delimits at least one guide channel. The conduit or the medium can be accommodated in the guide channel and thus guided, in particular along the guide channel or along the guide element.

In modern production plants, in particular in series production of motor vehicles such as automobiles, feed devices for respective industrial robots used in series production are used. The respective feed device is thereby provided, for example, for a manipulator arm having at least one joint, in particular of the respective industrial robot, and usually has a flexible or pliable conduit package via which at least one process means can be fed at least substantially along the end effector of the manipulator arm. The guide device is, for example, a component of the feed device, wherein, for example, the guide element, which is also referred to as the guide sleeve element, encloses the conduit package. The guide element is, for example, inherently pliable. Furthermore, the aforementioned at least one conduit is, for example, a component of the conduit package, such that, for example, in the respective feed device, the guide element, which is in particular pliable, surrounds or encloses the at least one conduit. As a result, the at least one conduit is accommodated in the guide channel and is guided by means of the guide element.

The conduit or conduit package is flexible, i.e., pliable or bendable, and in particular designed to be deformed by means of the manipulator arm. This means that the conduit package at least substantially follows a movement of the manipulator arm when the conduit package is deformed, in particular when the manipulator arm is moved around in space. The conduit can comprise, for example, at least one electrical conduction element, at least one fluid conduction element and/or some other tubular-, cable-, and/or hose element, such that by means of the conduit or by means of the conduit package, the process medium can be supplied to the end effector, and/or by means of the conduit the process medium can be discharged from the end effector.

The object of the present invention is to create a guide device and a use of such a guide device, such that a particularly advantageous guide of at least one conduit and/or at least one medium, in particular in the form of a fluid, can be implemented.

A first aspect of the invention relates to a guide device for guiding at least one conduit and/or at least one medium. Preferably, the conduit is a physical or physically present, material object which is, for example, solid, i.e., in a solid aggregate state. The medium can be, for example, a fluid such as a liquid, or a gas. The guide device comprises at least one guide element, which delimits at least one guide channel. In the guide channel, the conduit or the medium can be accommodated or guided. In other words, the conduit or the medium can be accommodated in the guide channel and thereby guided along the guide channel and thus along the guide element in a defined manner and as required.

In order to be able to guide the conduit or the medium in a particularly advantageous, demand-oriented and defined manner, it is provided in accordance with the invention that the guide element has at least or exactly two layers which are arranged one inside the other and are pliable. The feature that the layers are pliable is to be understood as meaning that the layers are inherently or individually dimensionally unstable or flexible and thus bendable. Again expressed in other words, the layers are slack per se, such that the layers intrinsically deform under their own weight, in particular when they are not stiffened or braced. The feature that the layers are arranged within each other is to be understood to mean that a first of the layers is arranged at least partially, in particular at least predominantly or completely, within the second layer, such that the first layer is arranged at least partially, in particular at least predominantly or completely, within the second layer. This means that the second layer surrounds at least one longitudinal region of the first layer on the outer peripheral side and thereby preferably completely peripherally in the peripheral direction of the first layer. The first layer is thus an inner layer, while the second layer is an outer layer at least partially surrounding the inner layer.

The layers delimit a chamber system arranged between the layers, which has a plurality of chambers which can be impinged upon by a fluid also referred to as a reinforcing fluid or stiffening fluid. The layers, in particular intrinsically, are impermeable to the fluid, such that the stiffening fluid cannot flow through the layers per se. The guide channel is, for example, bounded, in particular directly, by the inner layer, such that, for example, the guide channel is arranged or runs on a side of the inner layer facing away from the outer layer and also referred to as the inner side. This means that the inner layer is arranged, in particular in the radial direction of the guide element, between the guide channel and the chamber system, such that the chamber system is separated, in particular completely and/or fluidically, from the guide channel by means of the inner layer. If, for example, the medium flows through the guide channel, mixing of the medium flowing through the guide channel with the fluid received in the chamber system is preferably avoided.

By applying the stiffening fluid to the chamber system, the inherently pliable guide element can be stiffened or reinforced and thus converted into an inherently rigid state. In other words, if the chamber system is not exposed to the fluid, the guide element is pliable, due to the fact that the layers are inherently pliable. However, if the stiffening fluid is applied to the chamber system, the guide element is stiffened such that the guide element is inherently rigid or dimensionally stable. By applying the fluid to the chamber system, it is to be understood that the fluid is received in the chamber system or that the fluid is introduced into the chamber system and/or passed through the chamber system.

Preferably, the respective layer is formed from a plastic, in particular from a thermoplastic material. The plastic can, for example, be TPU (thermoplastic urethane). Preferably, the respective layer is intrinsically impermeable to the medium. The guide element is, for example, a tubular body, which can also be referred to as a ventilating body, in particular when the fluid comprises at least or exclusively air. This guide element is or can be inflated, for example, by applying the fluid to the chamber system, such that the guide element can exhibit independent inflation behavior. The guide element can, for example, be wrapped or encased, in particular internally and/or externally, in textile layers, which can, for example, by formed as fabric layers. The guide element and the textile layers enveloping the guide element, in particular on the outside and/or inside, form, for example, an overall system for guiding the medium and/or the conduit and thus for guiding or conducting energy, such that the overall system can function or be designed as an energy guidance system for supplying and/or discharging energy. The respective textile layer can also be referred to as a textile or textile structure or be formed from a textile structure. In particular, the respective textile layer can be formed as an inherently pliable fabric or can be formed from an inherently pliable fabric.

With the aid of the guide device, it is possible to guide the conduit or the medium as required, in a targeted, energy-efficient, low-effort and long-lasting manner, in order, for example, to supply a technical device such as, for example, an end effector of a manipulator arm, in particular of an industrial robot, with a process medium in a particularly advantageous manner and/or to discharge the process medium from the device. The process medium is, for example, the medium and/or electrical energy, which can be supplied to the end effector, for example, by means of the conduit. Alternatively or additionally, for example, the conduit or the medium can be discharged from the end effector in a particularly advantageous manner, such that the process medium can be discharged from the end effector in a particularly advantageous manner with the aid of the guide device according to the invention. However, the guide device according to the invention can of course also be used for other, in particular industrial, applications.

The fluid is, for example, a gas comprising at least or exclusively air. The chamber system thus forms, for example, a ventilation system or is a component of such a ventilation system, wherein by means of the ventilation system, the guide element can be stiffened or reinforced as required and thus held inherently rigid. Since the guide element is inherently pliable, i.e., when it is not stiffened, the guide element is a guide tube, also referred to simply as a tube. Since, for example, the impingement of the chamber system, in particular when the fluid comprises at least one gas, in particular at least air, is also referred to as ventilating or ventilation, the tube is also referred to, for example, as a ventilation tube. Due to the design of the guide device according to the invention, the tube can be manufactured as desired in its shape, type, scaling, etc., and thus forms, for example, a closed ventilation element or a ventilation element which is impermeable to the fluid, which enables particularly advantageous guidance of the medium or the conduit. The chamber system is, for example, a closed chamber system. This means that the chamber system or the layers forming the chamber system is or are impermeable to the fluid, wherein the chamber system forms an independent and advantageous support architecture or support structure. By means of the support structure, the guide element can be stiffened in a particularly advantageous manner by applying the fluid to the chamber system, such that a targeted, defined and stable guide can be represented.

In comparison to conventional solutions, the invention enables the use of advantageous or new materials, which means that the guide element can be manufactured using advantageous, new production processes. In addition, the guide element or the chamber system can be manufactured simply and thus in a time- and cost-efficient manner.

The aforementioned textile layers are produced, for example, by means of a textile manufacturing process, by means of which, for example, the textile layers are joined together. Furthermore, it is conceivable that the guide element is wrapped with the textile layers by means of the textile manufacturing process or during the manufacture of the textile layers. In this case, the chamber or ventilation system can be installed directly by means of the textile manufacturing process, in particular in the textile layers, or wrapped with the textile layers, in particular while the textile layers are being manufactured. In particular, the textile layers can be produced by means of a simple textile manufacturing process and thus can be implemented in a time-saving and cost-effective manner, wherein the guide element can be simply and cost-effectively wrapped with the textile layer and thus arranged therein. In particular, the guide device according to the invention can be used for an energy supply, in the scope of which the end effector described above is supplied with the process means and thus, for example, with energy. However, different technological applications for the guide device according to the invention are readily conceivable Since the fluid comprises, for example, at least or exclusively or at least predominantly air, the guide element can be pneumatically stiffened and thus pneumatically operated, in particular controlled. The fluid is provided, for example, by a fluid source, wherein the fluid source provides the fluid, for example, in particular in a controlled manner. As a result, the guide element can be pneumatically controlled, for example. Since, for example, by means of the guide element according to the invention, the process medium or energy can be guided to the end effector and/or guided away from the end effector, a pneumatically controllable and preferably textile, in particular fully textile, energy supply and/or energy discharge to or from an end effector of an industrial robot can be implemented by means of the guide element according to the invention or by means of the guide device according to the invention.

In an advantageous design of the invention, the layers are formed integrally with one another. In this way, the number of parts and thus the costs can be kept particularly low. In addition, a particularly advantageous impermeability of the guide element to the fluid can thereby be implemented.

In a further design of the invention, the layers are designed as components which are separately formed and connected to one another. In this way, the chamber system can be represented as required and in a particularly advantageous manner, such that the guide element can be stiffened in a particularly advantageous manner.

A further embodiment is characterized in that the layers are connected to one another in at least one respective connecting region. In particular, the layers can be sewn together and/or joined to one another by a material bond and/or welded together and/or adhered together. In this way, the layers can be connected to one another in a particularly impermeable manner. The adhesion and the welding involve a material-locking connection of the layers, whereby the layers can be connected to one another in a particularly impermeable manner.

The respective edge region is arranged, for example, in a respective end region or at a respective end of the respective layer or guide element. In other words, the layers are preferably connected to each other at at least one respective end of the respective layer or at their respective ends, wherein the layers are preferably connected to one another in an impermeable manner with respect to the fluid. As a result, the guide element can be manufactured simply and thus in a time- and cost-effective manner.

In a particularly advantageous embodiment of the invention, the chamber system is designed as a honeycomb system whose respective chamber has a polygonal, in particular an at least or exactly pentagonal or hexagonal, cross-section and is thus designed as a honeycomb. As a result, a particularly high rigidity of the guide element can be implemented in the stiffened state of the guide element.

In a further design of the invention, the chambers are at least partially separated from one another, in particular in the peripheral direction and/or in the longitudinal extension of the guide element, and are thus subdivided from one another. The chambers can be completely fluidically separated from one another, or the chambers are fluidically connected to one another, as a result of which the chambers can be acted upon by the fluid in a particularly advantageous manner. In particular, the chambers can be supplied with the fluid via at least or exactly one connection common to the chambers and thus be impinged upon. By at least partially separating and thus subdividing the chambers from one another, however, a particularly high rigidity of the guide element can be ensured.

A further embodiment is characterized by the fact that the chambers are separated from one another at respective connection points and are thus subdivided from one another, wherein the layers are connected to one another at the connection points, in particular directly. This means that the separation of the chambers is not or not only separated from each other by separating elements formed separately from the layers and provided in addition to the layers, but rather the chambers are separated from each other by the layers themselves, whereby the number of parts and thus the weight, the costs and the installation space requirements can be kept within a particularly low limit. Preferably, the respective layer is intrinsically formed as a single piece, i.e., considered separately.

It has proved to be particularly advantageous if the layers are sewn together and/or materially bonded to one another at the respective connection point and are, for example, welded and/or glued to one another, whereby the layers can be connected to one another in a particularly impermeable manner.

In order to be able to implement a particularly targeted and demand-oriented application of the fluid to the chamber system, in a further embodiment of the invention at least one ventilation connection is provided which is formed separately from the layers and through which the fluid can flow, which can be, for example, the previously mentioned connection. The fluid can be introduced into the chamber system via the ventilation connection.

A second aspect of the invention relates to a use of a guide device according to the invention. In the use, the guide device is used for guiding the at least one conduit and/or the at least one medium to and/or from an end effector of a manipulator arm, in particular an industrial robot. Advantages and advantageous designs of the first aspect of the invention are to be regarded as advantages and advantageous designs of the second aspect of the invention, and vice versa.

Further advantages, features and details of the invention emerge from the following description of the preferred exemplary embodiments and from the drawings. The features and combinations of features mentioned above in the description, as well as the features and combinations of features mentioned below in the description of figures and/or shown in the figures alone, can be used not only in the combination specified in each case, but also in other combinations or on their own, without departing from the scope of the invention.

DETAILED DESCRIPTION OF THE DRAWINGS

Figure 1:
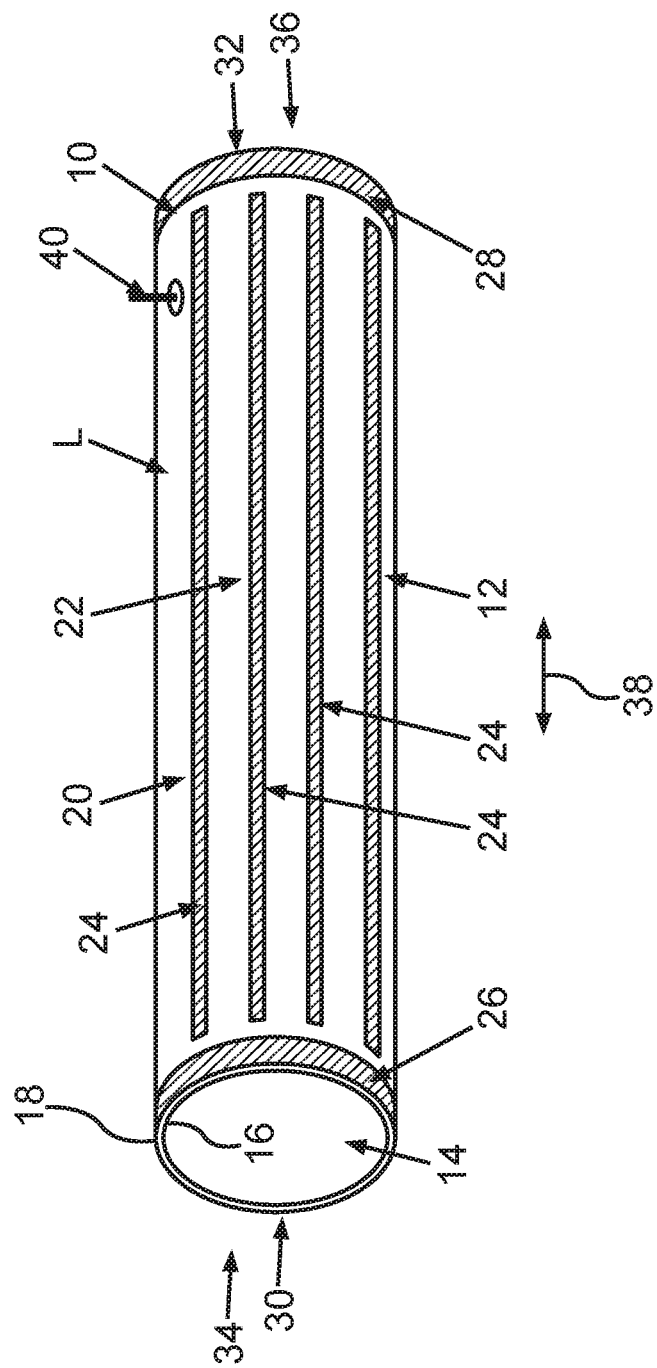
FIG. 1 is a schematic and perspective side view of a first embodiment of a guide device according to the invention.

Identical or functionally identical elements are provided with the same reference numerals in the figures.

FIG. 1 shows a schematic and perspective side view of a first embodiment of a guide device 10 for guiding at least one conduit and/or at least one medium not depicted in the figures. The medium is, for example, a gas or a liquid. In other words, the medium can comprise at least or exactly one liquid and/or at least or exactly one gas. The guide device 10 comprises at least one guide element 12, which at least or presently exactly delimits a guide channel 14. In the guide channel 14, at least one longitudinal region of the at least one conduit and/or the at least one medium can be accommodated and thereby guided. In other words, the conduit or the medium can be arranged in the guide channel 14 and thereby guided along the guide channel 14 and thus along the guide element 12.

By way of example, when the guide device 10 is used to guide the conduit or the medium, the conduit or the medium is arranged in the guide channel 14 and is guided by means of the guide channel 14 and thus by means of the guide element 12, in particular along the guide channel 14 or along the guide element 12. In the context of use, the guide element 12 or the guide device 10 is used, for example, to guide the conduit or the medium to a technical device and/or to discharge it from the technical device. The technical device is, for example, an end effector of a manipulator arm. The manipulator arm is, for example, a component of a robot also referred to as an industrial robot, which is used, for example, for a production, in particular a series production, of motor vehicles such as automobiles. The manipulator arm is also referred to as a robot arm or robot axis and can be moved around in the space, for example, in particular electrically and/or hydraulically and/or pneumatically, such that the end effector can be moved around in the space. In particular, the guide device 10 is used to guide at least one process means towards the end effector and thus to supply the end effector with the process means, and/or the guide device 10 is used to discharge the process means from the end effector. The process medium is, for example, the aforementioned medium, and/or the aforementioned at least one conduit is used to supply the process medium to the end effector and/or to discharge the process medium from the end effector. For this purpose, the conduit has, for example, at least one channel through which the process medium can flow, and/or the conduit comprises at least one electrical conduit, by means of which the process medium, which is designed, for example, as electrical energy, can be guided.

In particular, it is conceivable that a conduit package is used. The conduit package comprises, for example, several conduits, one of which is the aforementioned at least one conduit. The conduit package or the respective conduit in itself is dimensionally unstable and thus pliable, wherein the guide device 10 enables targeted, defined and demand-based guidance of the respective conduit.

For this purpose, the guide element 12 has at least or exactly two layers 16 and 18 which are arranged one inside the other and are pliable when considered in themselves or separately. The respective layer 16 or 18 is formed, for example, from a plastic, in particular from a thermoplastic material, and is inherently pliable, such that the guide element 12 is inherently pliable and thus dimensionally unstable, in particular when the guide element 12 is not stiffened. The feature that the layers 16 and 18 are arranged one inside the other is to be understood to mean that the layer 16, also referred to as the first layer, is arranged at least partially, in particular at least predominantly or completely, in the layer 18, also referred to as the second layer. Thus the layer 16 is an inner layer, while the layer 18 is an outer layer which completely peripherally surrounds at least one longitudinal region of the inner layer in the peripheral direction of the inner layer. As a result, the layers 16 and 18 overlap one another, in particular in the radial direction of the guide element 12, which is in the form of a hose or pliable tube in the present case.

The layers 16 and 18 delimit a chamber system 20 arranged between the layers 16 and 18, in particular in the radial direction of the guide element 12, which chamber system has a plurality of chambers 22 which can be acted upon by a fluid also referred to as reinforcing fluid or stiffening fluid. In the first embodiment shown in FIG. 1, the chambers 22 are fluidically connected to one another and are, however, separated from one another at respective separation points 24, in particular in the peripheral direction of the guide element 12, and are thus subdivided from one another. The layers 16 and 18 per se are thereby impermeable to the fluid, such that the fluid cannot flow out of the chamber system 20 in an undesirable manner. By applying the fluid to the chamber system 20 or the chambers 22, the guide element 12, which is in itself pliable, can be stiffened and thereby converted into an inherently rigid state. In other words, as long as the fluid, in particular in a sufficiently large quantity, is received in the chamber system 20 and/or flows through the chamber system 20, the intrinsically pliable and thus dimensionally unstable guide element 12 is stiffened and thus held in an inherently rigid state. Preferably, the layers 16 and 18 directly delimit the chambers 22, such that the fluid received in the chamber system 20 directly touches or contacts the layers 16 and 18.

The layers 16 and 18 can be integrally formed with each other. In the first embodiment shown in FIG. 1, it is also provided that the layers 16 and 18 are formed as components which are separately formed and connected to each other. The layers 16 and 18 are connected to each other, in particular in an impermeable manner, in respective, end-side connecting regions 26 and 28s. In the present case, the connecting regions 26 and 28 are arranged at respective ends 30 and 32 of the guide element 12 and thus of the layers 16 and 18, such that the layers 16 and 18 are connected to each other in an impermeable manner at the ends 30 and 32. As a result, the guide element 12 is impermeable to the fluid at its end-side end faces 34 and 36.

The separation points 24 are arranged in the longitudinal extension direction of the guide element 12 between the ends 30 and 32 and thus between the end faces 34 and 36, such that the chambers 22 are separated from one another at the respective separation points 24 in a longitudinal region L of the guide element 12 arranged or extending in the longitudinal extension of the guide element 12 between the ends 30 and 32 and thus between the end faces 34 and 35 in the peripheral direction of the guide element 12. The separation points 24 run in the longitudinal region L. The respective separation point 24 runs in a straight line in the present case and in the longitudinal extension direction of the guide element 12, the longitudinal extension direction of which is illustrated in FIG. 1 by a double arrow 38. In regions different from the separation points 24 and from the connecting regions 26 and 28, the layers 16 and 18 are, for example, separated from each other or detached from each other or loose from each other and thus not connected to each other, such that the fluid is received in the regions and can flow through the regions. As a result, the chambers 22 are fluidically connected to one another.

In the first embodiment, the chambers 22 are separated from one another in the longitudinal region L exclusively in the peripheral direction of the guide element 12, presently at the respective separation points 24. The respective separation point 24 is a respective connection point at which the layers 16 and 18 are connected to each other. The previous and following explanations regarding the respective connecting region 26 or 28 can also be applied to the respective connecting point and vice versa. In the connecting regions 26 and 28 and at the separation points 24, the layers 16 and 18 are, for example, sewn to each other and/or joined to each other by a material bond and are thereby, for example, welded to each other and/or adhered to each other. In this way, the layers 16 and 18 can be connected to one another in a particularly impermeable manner. The guide device 10 further comprises at least or exactly one ventilation connection 40, through which the fluid can flow. Via the ventilation connection 40, the fluid comprising, for example, at least or exclusively air can be introduced into the chamber system 20 and thus into the chambers 22, such that the chamber system 20 or the chambers 22 can be supplied with the fluid via the ventilation connection 40 and can thereby be acted upon by the fluid.

Overall, it can be seen that the inherently pliable guide element 12 is formed as a hose, which is also referred to as a ventilation hose, sleeve or base sleeve. The base sleeve is, for example, a component of a ventilation system or forms a ventilation system. The ventilation system provides, for example, the fluid that is introduced into the chamber system 20 via the ventilation connection 40.

Fields of application for which or in which the guide device 10 can be used range, for example, from a respective medium guide in an industrial environment to the opposite of other, further technical applications. By way of example, a place of use for a use of the guide device 10 does not play a role, but only its technical properties and development, which makes it possible to flexibly guide and/or position at least one medium or several mediums and/or the aforementioned at least one conduit in the guide element 12, which is, for example, inherently stable and, for example, designed as a fabric system. The guide device 10 can thereby also be used for other fields of application or transferred to such fields of application. The ventilation hose can be manufactured as desired in its shape, type and scaling and thus forms a closed ventilation element by means of which mediums and/or conduits can be guided particularly advantageously.

The chamber system 20 is designed, for example, as a honeycomb system whose respective chamber 22 is designed, for example, as a honeycomb and thus has a polygonal, in particular pentagonal or hexagonal, cross-section. In this way, a particularly high rigidity can be ensured. The chamber system 20 thus forms a support architecture or support structure by means of which the guide element 12 can be stiffened in a particularly advantageous manner. The support architecture can be designed at least almost freely in terms of the type of design, the number and shape of the chambers 22, the diameter, the material thickness, the material properties, the length and the flexible positioning of the ventilation connection 40 and can be adapted to respective purposes.

An arrangement or attachment of the ventilation connection 40 to the guide element 12 (ventilation hose) is possible at at least almost any position and is defined, for example, by a technical application and can thus vary depending on the application. Preferably, the ventilation connection 40 is fixedly connected to the ventilation hose and forms a technical unit therewith, in particular in the form of the guide device 10. The type and design of the ventilation connection 40 is also at least almost freely selectable and can vary depending on the application.

The ventilation hose is preferably designed as a self-sealing system and be operated either with process air or with a one-time ventilation in the course of an energy supply. In other words, it is conceivable that, for example, the fluid configured in particular as process air flows at least substantially continuously or permanently through the chamber system 20 during an operation of the guide device 10 or of the industrial robot, and is thus introduced into the chamber system 20 at a first location and discharged from the chamber system 20 at a second location. Furthermore, it is conceivable that the fluid is first introduced into the chamber system 20. Thereafter, an introduction of the fluid into the chamber system 20 is terminated such that the previously introduced fluid remains accommodated in the chamber system 20. A ventilation strength, i.e., for example a pressure and/or a quantity and/or a volume of the fluid in the chamber system 20 can be set at least almost freely and is, for example, dependent on technical requirements of a corresponding application.

Due to the type of ventilation hose, it is now possible, for example, to insert textile parts of a basic sleeve into the ventilation hose on the one hand and to guide an external textile over the ventilation tube on the other. In this way, for example, the ventilation hose, in particular on the outside and inside, is wrapped with textile layers or enclosed in textile layers. These three parts can then in their entirety form a basic sleeve in the sense of an energy supply and/or energy discharge. All three parts are adapted to, for example, in particular previous, connection elements. The adaptation to the connection elements creates, for example, an additional variant of a fully textile and pneumatically controllable energy supply, in particular for robotics. Furthermore, the guide device 10 can be used for further novel medium guides and outside of robotics.

Overall, it can be seen that the guide element 12 is a hose body, which is formed at least by the layers 16 and 18. The layers 16 and 18 are thus, for example, respective hose walls which form the ventilation tube. The hose walls are connected to each other, for example, at technically advantageous or required positions. This connection can be made in different ways such as, for example, by welding and/or gluing and/or by a manufacturing process in a composite such as, for example, by means of an extrusion tool which, for example, creates the chamber system 20 during a manufacture of the layers 16 and 18. The resulting chamber system 20, which is also referred to as a chamber structure or honeycomb structure, forms an air body. The connection regions 26 and 28 are connection points and form, for example, the previously mentioned support architecture.

The connection technology of the ventilation connection 40 can be adapted to requirements. By way of example, a hose through which the fluid can flow is connected to the ventilation connection 40, such that the fluid is introduced into the chamber system 20 via the hose and the ventilation connection 40. By way of example, the ends 30 and 32 of the hose body together with the inner layer 16 and the outer layer 18 serve as a clamp on the previously mentioned connection elements. By way of example, the hose body together with the layers 16 and 18 formed, for example, as fabric layers, forms an energy supply for one or more internally guided mediums, which are guided, for example, by means of the guide channel 14 and thereby through the guide channel 14.

Figure 2:
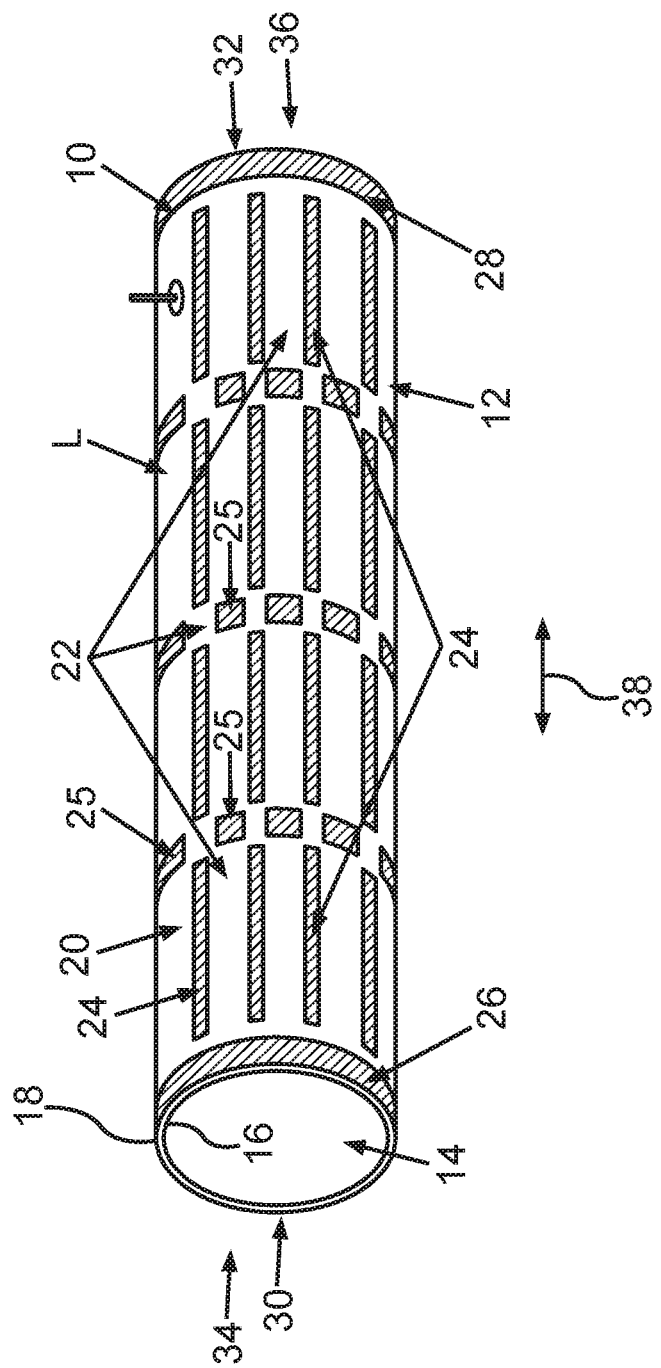
FIG. 2 is a schematic and perspective side view of the guide device according to a second embodiment.

FIG. 2 shows a second embodiment of the guide device 10. The second embodiment differs in particular from the first embodiment in that the chambers 22 of the chamber system 20 in the longitudinal region L are not only separated from one another in the peripheral direction of the guide element 12 and thereby separated from one another by or at the separating points 24 and thus subdivided from one another, but the chambers 22 are also separated from one another in the longitudinal region L in the longitudinal extension direction of the guide element 12 and thereby subdivided from one another. For this purpose, the layers 16 and 18 are connected to each other in the longitudinal region L at respective, further connecting points 25, in particular directly. Thus, the connecting points 25 are further separation points at which the chambers 22 are separated from one another in the longitudinal extension direction of the guide element 12.

The invention claimed is:

1. A guide device for guiding a conduit or a medium, comprising:
a guide element which delimits a guide channel in which the conduit or the medium is accommodatable and guidable;
wherein the guide element has a first layer and a second layer which are disposed one inside the other, are pliable, and delimit a chamber system which is disposed between the first layer and the second layer;
wherein the chamber system has a plurality of chambers;
wherein the first layer and the second layer are impermeable to a fluid;
wherein, by acting upon the chamber system with the fluid, the guide element, which is intrinsically pliable, is stiffenable and thereby converted into a rigid state.

2. The guide device according to claim 1, wherein the first layer and the second layer are formed integrally with each other.

3. The guide device according to claim 1, wherein the first layer and the second layer are formed separately from each other and are connected to each other.

4. The guide device according to claim 1, wherein the first layer and the second layer are connected to each other in a connecting region.

5. The guide device according to claim 1, wherein the first layer and the second layer are sewn to each other or connected to each other by a material bond or are welded to each other or are adhered to each other.

6. The guide device according to claim 1, wherein the chamber system is a honeycomb system that has a polygonal cross-section.

7. The guide device according to claim 1, wherein the plurality of chambers are at least partially separated from one another.

8. The guide device according to claim 7, wherein the plurality of chambers are at least partially separated from one another in a peripheral direction of the guide element or in a longitudinal extension direction of the guide element.

9. The guide device according to claim 7, wherein the plurality of chambers are separated from one another at a connecting point of the first layer and the second layer.

10. The guide device according to claim 9, wherein the first layer and the second layer are sewn to each other at the connecting point or are connected to each other by a material bond at the connecting point or are welded to each other at the connecting point or are adhered to each other at the connecting point.

11. The guide device according to claim 1 further comprising a ventilation connection formed separately from the first layer and the second layer, wherein the fluid is flowable through the ventilation connection and wherein the fluid is introducible into the chamber system via the ventilation connection.

12. A method of using the guide device according to claim 1, comprising the step of:
   guiding a conduit or a medium by the guide device to or from an end effector of a manipulator arm.

* * * * *